US008925169B2

(12) United States Patent  
Schevers

(10) Patent No.: US 8,925,169 B2  
(45) Date of Patent: Jan. 6, 2015

(54) DRILL FORCE INDICATOR FOR HAND-OPERATED DRILLS

(75) Inventor: Isaac Charles Schevers, Festus, MO (US)

(73) Assignee: The Boeing Company, Chicago, IL (US)

( * ) Notice: Subject to any disclaimer, the term of this patent is extended or adjusted under 35 U.S.C. 154(b) by 548 days.

(21) Appl. No.: 13/238,359

(22) Filed: Sep. 21, 2011

(65) Prior Publication Data

US 2013/0071195 A1 Mar. 21, 2013

(51) Int. Cl.
*B23B 49/00* (2006.01)
*B23Q 11/04* (2006.01)
*B23Q 17/09* (2006.01)

(52) U.S. Cl.
CPC .............. *B32B 49/00* (2013.01); *B23Q 11/04* (2013.01); *B23Q 17/0952* (2013.01)
USPC .............. 29/407.08; 408/6; 408/16; 408/139; 408/142

(58) Field of Classification Search
USPC ................. 408/5, 6, 139–142, 16; 29/407.08
IPC ....................................................... B23B 49/00
See application file for complete search history.

(56) References Cited

U.S. PATENT DOCUMENTS

| | | | | |
|---|---|---|---|---|
| 1,555,098 A * | 9/1925 | Benko | ............................ | 408/140 |
| 2,394,348 A * | 2/1946 | Wilhide | ............................ | 81/475 |
| 2,429,564 A * | 10/1947 | Petersen | ............................ | 279/16 |
| 2,523,584 A * | 9/1950 | Miller | ............................ | 470/209 |
| 2,787,797 A * | 4/1957 | Kalafsky | ............................ | 408/142 |
| 3,178,739 A * | 4/1965 | Plummer et al. | ............................ | 408/141 |
| 3,627,437 A * | 12/1971 | Smith | ............................ | 408/16 |
| 3,652,099 A * | 3/1972 | Bilz | ............................ | 279/75 |
| 3,688,815 A * | 9/1972 | Ridenour et al. | ............................ | 83/522.25 |
| 3,697,186 A * | 10/1972 | Smith | ............................ | 408/142 |
| 3,723,017 A * | 3/1973 | Bilz et al. | ............................ | 408/16 |
| 3,816,015 A * | 6/1974 | Bilz et al. | ............................ | 408/6 |
| 3,968,705 A * | 7/1976 | Amano et al. | ............................ | 74/89.38 |
| 4,090,802 A * | 5/1978 | Bilz | ............................ | 408/6 |
| 4,198,180 A | 4/1980 | Schultz | | |
| 4,317,511 A * | 3/1982 | Asai | ............................ | 192/56.57 |
| 4,507,025 A * | 3/1985 | Fedor | ............................ | 408/6 |
| 4,507,030 A * | 3/1985 | Jackson | ............................ | 409/185 |

(Continued)

FOREIGN PATENT DOCUMENTS

DE 2747516 4/1979

OTHER PUBLICATIONS

European Patent Office, International Searching Authority, International Search Report and Written Opinion of PCT/US2012/050620, Date of Mailing Jan. 16, 2013, 17 pages.

(Continued)

*Primary Examiner* — Eric A Gates
(74) *Attorney, Agent, or Firm* — Klintworth & Rozenblat IP LLC

(57) ABSTRACT

An apparatus for indicating a drilling thrust of a hand-operated drill includes a thrust-indicator assembly for attaching between a drill motor and a drill chuck of the hand-operated drill to indicate the drilling thrust. A method of indicating a drilling thrust asserted on a hand-operated drill includes: attaching a thrust-indicator assembly between a drill motor and a drill chuck of a hand-operated drill; and indicating, with the thrust-indicator assembly, a drilling thrust asserted on the drill chuck.

25 Claims, 14 Drawing Sheets

(56) References Cited

U.S. PATENT DOCUMENTS

| | | | | |
|---|---|---|---|---|
| 5,155,473 | A | * | 10/1992 | Oketani et al. ............... 340/680 |
| 5,351,039 | A | * | 9/1994 | Oketani et al. ............... 340/680 |
| 6,565,293 | B2 | * | 5/2003 | Desmoulins .................... 408/10 |
| 6,665,948 | B1 | | 12/2003 | Kozin et al. |
| 7,504,791 | B2 | | 3/2009 | Sieber et al. |

OTHER PUBLICATIONS

Jantunen, Erkki; "A Summary of Methods Applied to Tool Condition Monitoring in Drilling"; International Journal of Machine Tools & Manufacture; 42 (2002) 997-1010.

Shri Vekateshwara Associates; "Equipment for Mechanical Measurement Laboratory; Drill Tool Dynamometer"; accessed May 3, 2011.

* cited by examiner

DRILL FORCE INDICATOR FOR HAND-OPERATED DRILLS

FIELD OF THE DISCLOSURE

The disclosure relates to apparatus and methods for indicating a drilling thrust of a hand-operated drill.

BACKGROUND OF THE DISCLOSURE

When using a hand-operated drill, a user typically grips a handle of the drill and asserts a thrust on the drill towards a surface against which a drill bit of the drill is disposed in order to drill a hole into the surface. If the user asserts thrust on the drill outside of the optimum thrust range, this may lead to several problems. These problems may include one or more of the following: the drilling process taking longer than needed; the drilling process being unsafe; ergonomic issues; work-hardening of the surface due to excessive heat; the drilling process requiring more effort of the user than needed; damage being done to the drill bit or to the drill itself; damage being done to the surface into which the hole is being drilled; or the drilling process resulting in a low-quality hole being drilled in the surface.

There is a need for an apparatus and method which will resolve one or more issues of the current art.

SUMMARY OF THE DISCLOSURE

In one embodiment, an apparatus is disclosed which indicates a drilling thrust of a hand-operated drill. The apparatus comprises a thrust-indicator assembly for attaching between a drill motor and a drill chuck of a hand-operated drill to indicate a drilling thrust of the hand-operated drill.

In another embodiment, a hand-operated drill is disclosed. The hand-operated drill comprises a drill motor, a drill chuck, and a thrust-indicator assembly. The thrust-indicator assembly is attachable between the drill motor and the drill chuck for indicating a drilling thrust of the hand-operated drill.

In an additional embodiment, a method is disclosed of indicating a drilling thrust asserted on a hand-operated drill. In one step, a thrust-indicator assembly is attached between a drill motor and a drill chuck of a hand-operated drill. In another step, a drilling thrust asserted on the drill chuck is indicated with the thrust-indicator assembly.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
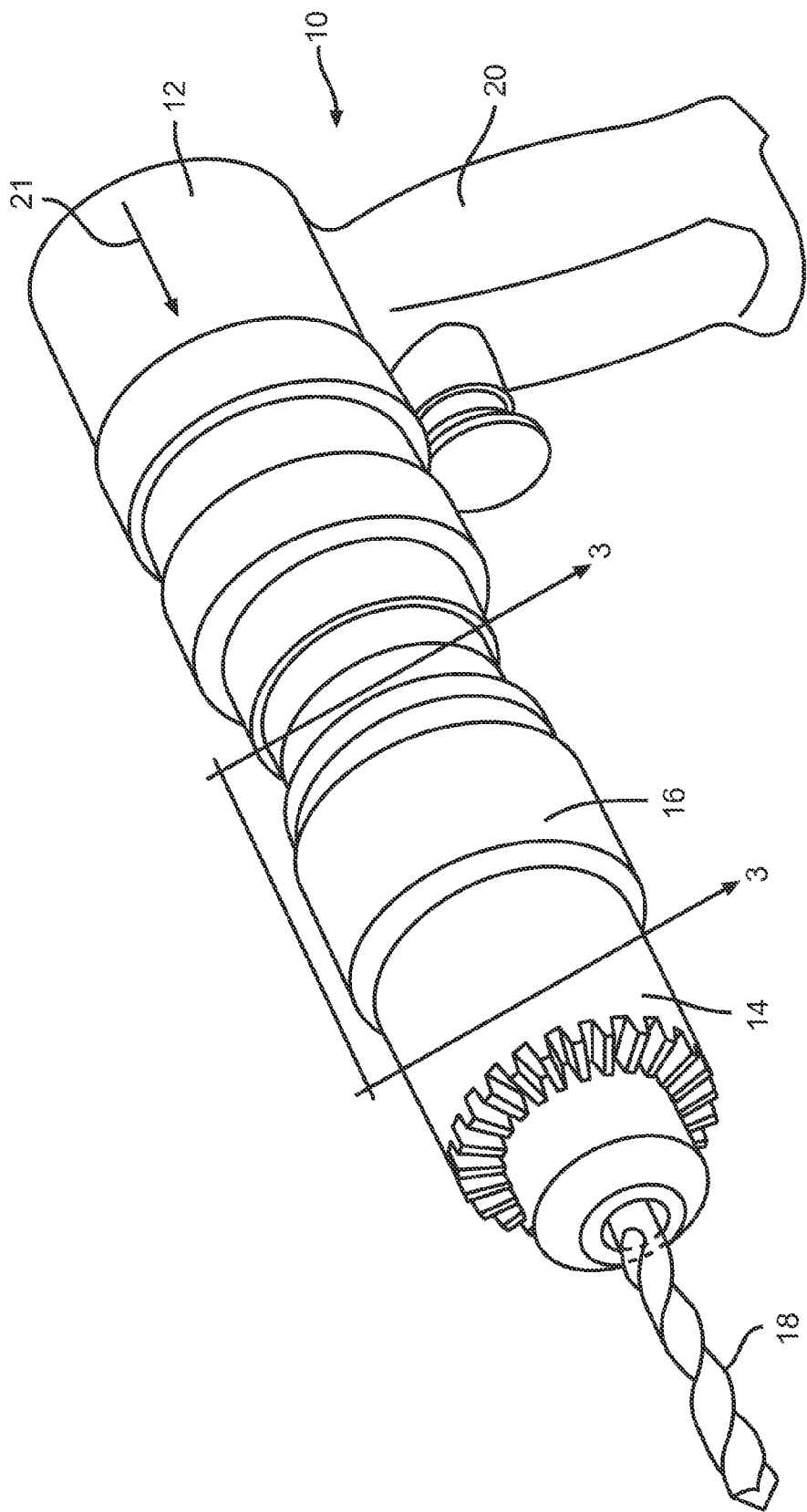
FIG. 1 illustrates a perspective view of one embodiment of a hand-held drill comprising a thrust-indicator assembly attached between a drill motor and a drill chuck.

FIG. 1 illustrates a perspective view of one embodiment of a hand-held drill 10. The hand-drill 10 comprises a drill motor 12, a drill chuck 14, and a thrust-indicator assembly 16 attached between the drill motor 12 and the drill chuck 14. The drill motor 12 rotates the thrust-indicator assembly 16 which in turn rotates the drill chuck 14 to drill a hole with a drill bit 18 which is removably attached to the drill chuck 14. The drill motor 12 includes a handle 20 which is shaped like a pistol grip. The thrust-indicator assembly 16 is attachable and detachable between the drill motor 12 and the drill chuck 14 for indicating a drilling thrust 21 of the hand-held drill 10.

Figure 2:
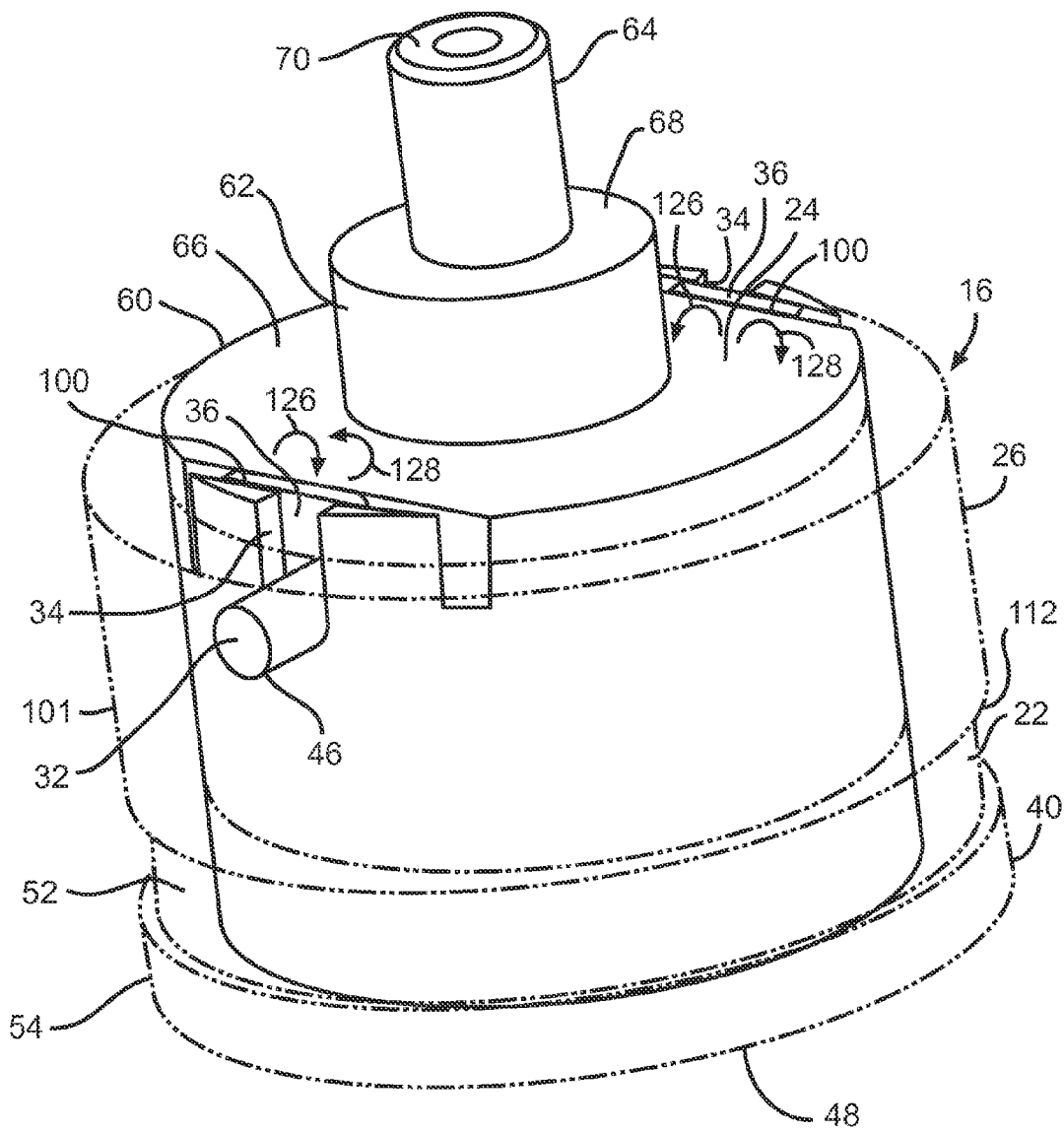
FIG. 2 illustrates a perspective view of the thrust-indicator assembly of the hand-held drill of FIG. 1.
Figure 3:
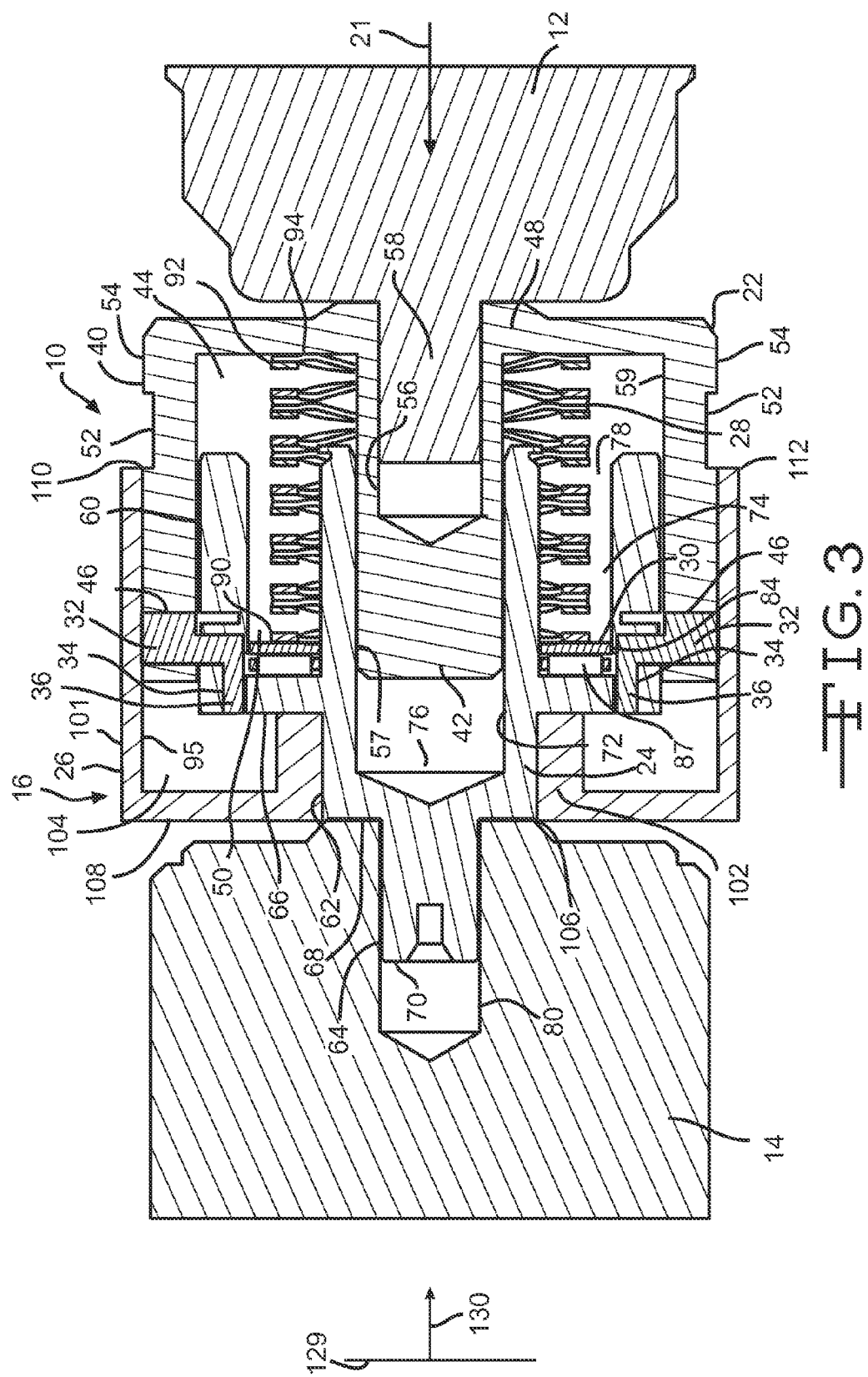
FIG. 3 illustrates a cross-sectional view through line 3-3 of the hand-drill of FIG. 1.

FIG. 2 illustrates a perspective view of the thrust-indicator assembly 16 of FIG. 1. FIG. 3 illustrates a cross-sectional view through line 3-3 of the hand-drill 10 of FIG. 1. As shown collectively in FIGS. 2 and 3, the thrust-indicator assembly 16 comprises a driver member 22, a driven member 24, an indicator 26, a biasing member 28, a thrust bearing 30, driver mating members 32, and driven mating members 34 and 36.

As shown collectively in FIGS. 2 and 3, the driver member 22 comprises a cylindrical outer surface 40, an inner shaft 42, and a cylindrical opening 44 between the cylindrical outer surface 40 and the inner shaft 42. The cylindrical outer surface 40 is smooth and non-threaded. Holes 46 extend through the cylindrical outer surface 40 into the cylindrical opening 44. One end 48 of the driver member 22 is closed and another end 50 of the driver member 22 is open. An acceptable portion 52 and an unacceptable portion 54 are disposed in the cylindrical outer surface 40. The acceptable portion 52 comprises a cylindrical cut-out area for indicating that a drilling thrust 21 is within an acceptable range. The unacceptable portion 54 comprises a remainder of the cylindrical outer surface 40 which is outside of the acceptable portion 52. The acceptable portion 52 may be of a different color than the unacceptable portion 54. In other embodiments, they may be the same color. A cylindrical threaded female attachment opening 56 (also referred to as an attachment member) extends from the closed end 48 of the driver member 22 partway into the inner shaft 42. A shaft 58 of the drill motor 12 threadedly attaches to the cylindrical threaded female attachment opening 56 of the driver member 22. In other embodiments, the drill motor 12 may be attached to the driver member 22 using varying attachment mechanisms. An outer wall 57 of the inner shaft 42 and an inner wall 59 of the driver member 22 are both smooth and non-threaded. The driver member 22 is preferably steel. In other embodiments, the driver member 22, including the acceptable portion 52 and the unacceptable portion 54, may comprise varying materials, or be in various shapes, sizes, orientations, configurations, or colors.

As shown collectively in FIGS. 2 and 3, the driven member 24 comprises, in decreasing size, first, second, and third cylindrical outer surfaces 60, 62, and 64. The first cylindrical outer surface 60 is smooth and non-threaded. The second and third cylindrical outer surfaces 62 and 64 are both threaded. Outer surface 66 extends perpendicularly between the first and second cylindrical outer surfaces 60 and 62. Outer surface 68 extends perpendicularly between the second and third cylindrical outer surfaces 62 and 64. An end surface 70 is disposed over the third cylindrical surface 64. An inner shaft 72 is disposed within the driven member 24. A cylindrical opening 74 is disposed between the first cylindrical outer surface 60 and the inner shaft 72. Another cylindrical opening 76, which is smooth and non-threaded, extends from an open end 78 of the driven member 24 into the inner shaft 72. The third cylindrical outer surface 64, also referred to as a cylindrical threaded male attachment member, threadedly attaches to a cylindrical threaded female attachment opening 80 of the drill chuck 14. In other embodiments, the driven member 24 may be attached to the drill chuck 14 using varying attachment mechanisms. The cylindrical threaded male attachment member 64 of the driven member 24 is sized so that it would threadedly attach to the cylindrical threaded female attachment opening 56 of the driver member 22. Driven mating members 34, which comprise slots, extend from the first cylindrical outer surface 60 partway through the first cylindrical outer surface 60 and end at inner walls 84. The driven mating members 34 further extend from the outer surface 66 partway length-wise along the first cylindrical outer surface 60. In other embodiments, the driven mating members 34 may comprise varying types of mating members of differing shapes, sizes, configurations, orientations, and materials. The driven member 24 is preferably steel. In other embodiments, the driven member 24 may comprise varying materials, or be in various shapes, sizes, orientations, configurations, or colors.

As shown in FIG. 3, a thrust bearing 30 is disposed within the cylindrical opening 74 of the driven member 24 against inner wall 87 of the driven member 24. A biasing member 28 is disposed in the cylindrical openings 44 and 74 of the driver member 22 and the driven member 24. One end 90 of the biasing member 28 pushes against the thrust bearing 30 and the other end 92 of the biasing member 28 pushes against inner wall 94 of the driver member 22. In such manner, the biasing member 28 biases the driver member 22 and the driven member 24 away from one another. The biasing member 28 is a steel spring. In other embodiments, the biasing member 28 may be a varying type biasing member of differing shapes, sizes, orientations, configurations, and materials.

As shown in FIGS. 2 and 3 collectively, driver mating members 32 extend through the holes 46 in the cylindrical outer surface 40 of the driver member 22, into the driven mating members 34 of the first cylindrical outer surface 60 of the driven member 24, against the inner walls 84 of the driven member 24. An inner surface 95 of the indicator 26 prevents the driver mating members 32 from coming out of the holes 46 in the cylindrical outer surface 40 of the driver member 22. The driver mating members 32 comprise steel lugs. In other embodiments, the driver mating members 32 may comprise varying type mating members of differing shapes, sizes, orientations, configurations, and materials.

As shown in FIGS. 2 and 3 collectively, driven mating members 36 are hinged at one end 100 of the driven mating members 36 to the driven member 24 so that the driven mating members 36 are adapted to rotate in respective opposite directions 126 to cover and in respective opposite directions 128 to uncover the driven mating members 34. The driven mating members 36 comprise steel pawls. In other embodiments, the driven mating members 36 may comprise varying types of mating members of differing shapes, sizes, orientations, configurations, and materials.

When the driver mating members 32 are disposed within the driven mating members 34 and a user is asserting a thrust 21 on the drill motor 12 which is less than a thrust threshold 129 which does not overcome the opposed forces 130 of the biasing member 28 and the driven mating members 36, the drill motor 12 rotates the driver member 22, which in turn rotates the driven member 24, which in turn rotates the drill chuck 14, which in turn rotates the drill bit 18. When the user asserts a thrust 21 on the drill motor 12 which is greater than the thrust threshold 129 which overcomes the opposed forces 130 of the biasing member 28 and the driven mating members 36, the thrust 21 on the drill motor 12 forces the driver mating members 32 of the driver member 22 against the driven mating members 36 of the driven member 24 rotating them and forcing the driver mating members 32 of the driver member 22 to come out of the driven mating members 34 of the driven member 24. At this point in time, although the drill motor 12 continues to rotate the driver member 22, the driver member 22 no longer rotates the driven member 24 which in turn stops the attached drill chuck 14 and drill bit 18 from rotating. A designer of the thrust indicator assembly 16 will choose the biasing member 28 and the driven mating members 36 so that the amounts of their total opposed forces 130 match-up with the desired thrust threshold 129. In such manner, a designer can design the thrust-indicator assembly 16 to only allow drilling to take place when the thrust 21 asserted on the hand-held drill 10 is less than the selected thrust threshold 129. In other embodiments, the thrust-indicator assembly 16 may be designed to only allow drilling when the thrust 21 asserted on the hand-held drill 10 is within an acceptable range.

As shown in FIGS. 2 and 3 collectively, the indicator 26 comprises a cylindrical outer surface 101, an inner shaft 102, and cylindrical openings 104 and 106. The inner shaft 102 extends from end 108 of the indicator 26. End 110 of the indicator 26 is open. Cylindrical opening 104 is disposed between the inner shaft 102 and the cylindrical outer surface 101. Cylindrical opening 106 extends from end 108, through the inner shaft 102, into the cylindrical opening 104. An inner surface 95 of the indicator 26 is smooth and non-threaded. Cylindrical opening 106 is threaded and threadedly attaches to the second cylindrical outer surface 62 of the driven member 24 so that the indicator 26 moves with the driven member 24. In other embodiments, the indicator 26 may be attached to the driven member 24 using varying attachment mechanisms. Depending on the amount of thrust 21 asserted by the drill motor 12, the indicator 26 moves relative to the driver member 22 so that a segment 112 of the indicator 26 is positioned along the acceptable portion 52 when the thrust 21 is within an acceptable range and under the thrust threshold 129, and so that the segment 112 of the indicator 26 is positioned along the unacceptable portion 54 and outside of the acceptable portion 52 when the thrust 21 is outside of the acceptable range and exceeds the thrust threshold 129. The color of the segment 112 of the indicator 26 is different than the colors of the acceptable portion 52 and the unacceptable portion 54. In other embodiments, the colors may be the same. The indicator 26 is preferably plastic. In other embodiments, the indicator 26 may comprise varying materials, or be in various shapes, sizes, orientations, configurations, or colors.

As best visualized in FIG. 3, to install the thrust-indicator assembly 16 to a hand-drill 10, the driven mating members 36 are hinged to the driven member 24 and disposed over the driven mating members 34. The thrust bearing 30 is then disposed within the cylindrical opening 74 of the driven member 24 against the inner wall 87 of the driven member 24. The biasing member 28 is then disposed within the cylindrical opening 74 of the driven member 24 against the thrust bearing 30. The driver member 22 is then slid part-way over the driven member 24 with the inner wall 59 of the driver member 22 sliding over the first cylindrical outer surface 60 of the driven member 24 and the outer wall 57 of the inner shaft 42 of the driver member 22 sliding within the cylindrical opening 76 of the inner shaft 72 of the driven member 24. This causes end 92 of the biasing member 28 to push against inner wall 94 of the driver member 22. The position of the driver member 22 relative to and over the driven member 24 is adjusted so that the holes 46 of the driver member 22 are aligned with the driven mating members 34 of the driven member 24. The driver mating members 32 are then slid through the holes 46 of the driver member 22 into the driven mating members 34 of the driven member 24 with the driven mating members 36 disposed over both the driven mating members 34 and the driver mating members 32. The inner surface 95 of the indicator 26 is slid over the cylindrical outer surface 40 of the driver member 22 and the cylindrical opening 106 of the indicator 26 is threadedly attached to the second cylindrical outer surface 62 of the driven member 24 locking the driver mating members 32 between the inner surface 95 of the indicator 26 and the inner walls 84 of the driven member 24. The shaft 58 of the drill motor 12 is then threadedly attached to the cylindrical threaded female attachment opening 56 of the driver member 22. The third cylindrical outer surface 64 of the driven member 24, also referred to as the cylindrical threaded male attachment member, is then threadedly attached to the cylindrical threaded female attachment opening 80 of the drill chuck 14.

Figure 4:
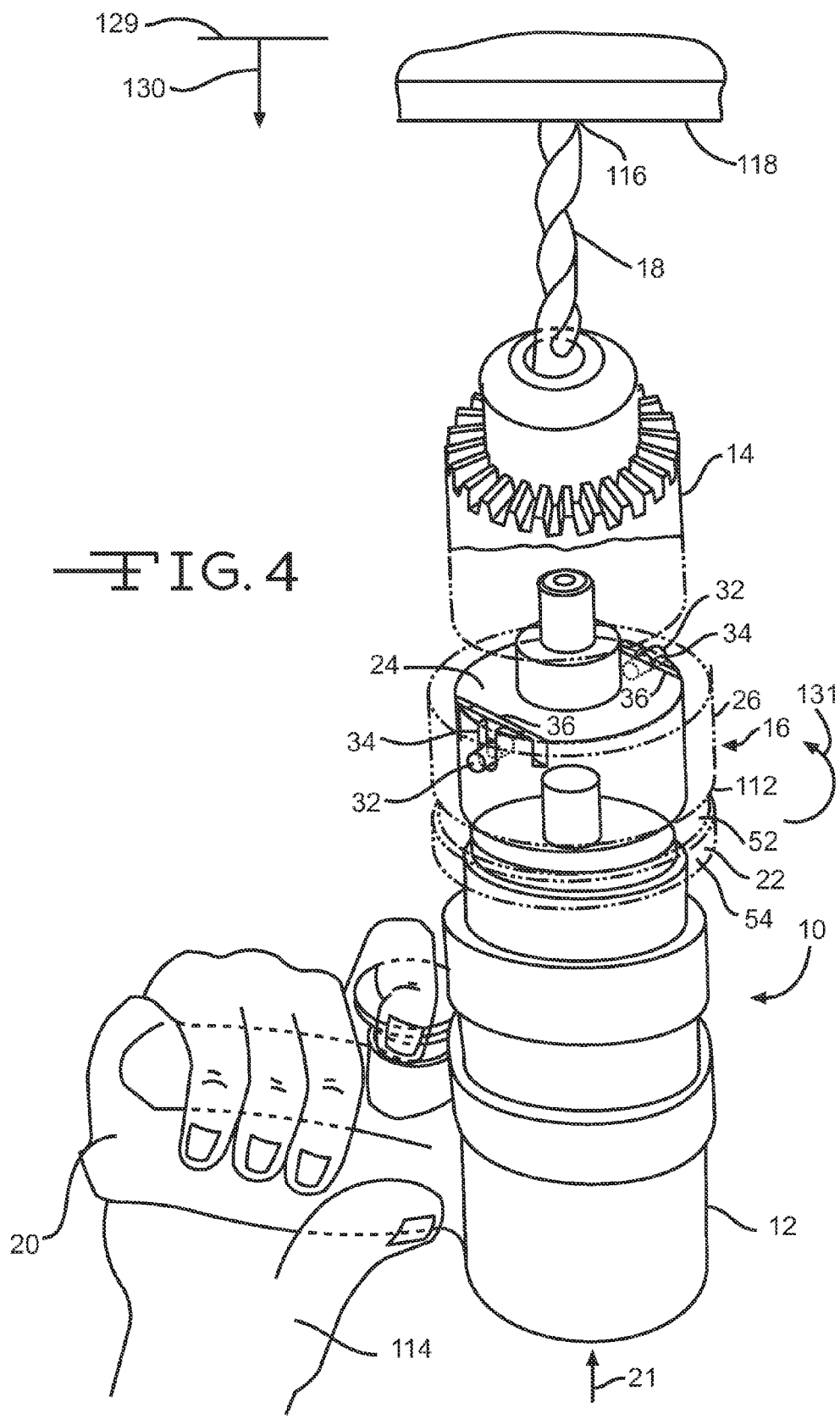
FIG. 4 illustrates a perspective view of the hand-held drill of FIG. 1 being used by a user to drill a hole in a surface by placing a thrust on the hand-held drill.

FIG. 4 illustrates a perspective view of the hand-held drill 10 of FIG. 1 being used by a user 114 to drill a hole 116 in a surface 118 by placing a thrust 21 on the hand-held drill 10. The user 114 is holding the handle 20 and asserting the thrust 21 on the hand-held drill 10 pressing the drill bit 18 of the hand-held drill 10 against the surface 118 to drill the hole 116. The thrust-indicator assembly 16 is installed to the drill motor 12 and the drill chuck 14 and some of the inner portions of the thrust-indicator assembly 16 are shown. The drill motor 12 rotates the driver member 22 in direction 131 which in turn rotates the driven member 24 in direction 131 which in turn rotates the drill chuck 14 in direction 131 which in turn rotates the drill bit 18 in direction 131. The driver member 22 rotates the driven member 24 because the driver mating members 32 are disposed within the driven mating members 34 with the driven mating members 36 disposed over both the driven mating members 34 and the driver mating members 32. The driver mating members 32 and the driven mating members 34 and 36 are disposed in these relative positions because the amount of thrust 21 being placed on the hand-held drill 10 by the user 114 is under a thrust threshold 129 comprising the opposed forces 130 of the biasing member 28 and the driven mating members 36 which are hidden from view but viewable in FIG. 3. A segment 112 of the indicator 26 is positioned along the acceptable portion 52 outside of the unacceptable portion 54 indicating to the user 114 that the thrust 21 being asserted on the hand-held drill 10 is within an acceptable range. The user 114 knows that the thrust 21 being asserted on the hand-held drill 10 is within the acceptable range because the acceptable portion 52 is viewable and not covered up by the segment 112 of the indicator 26.

Figure 5:
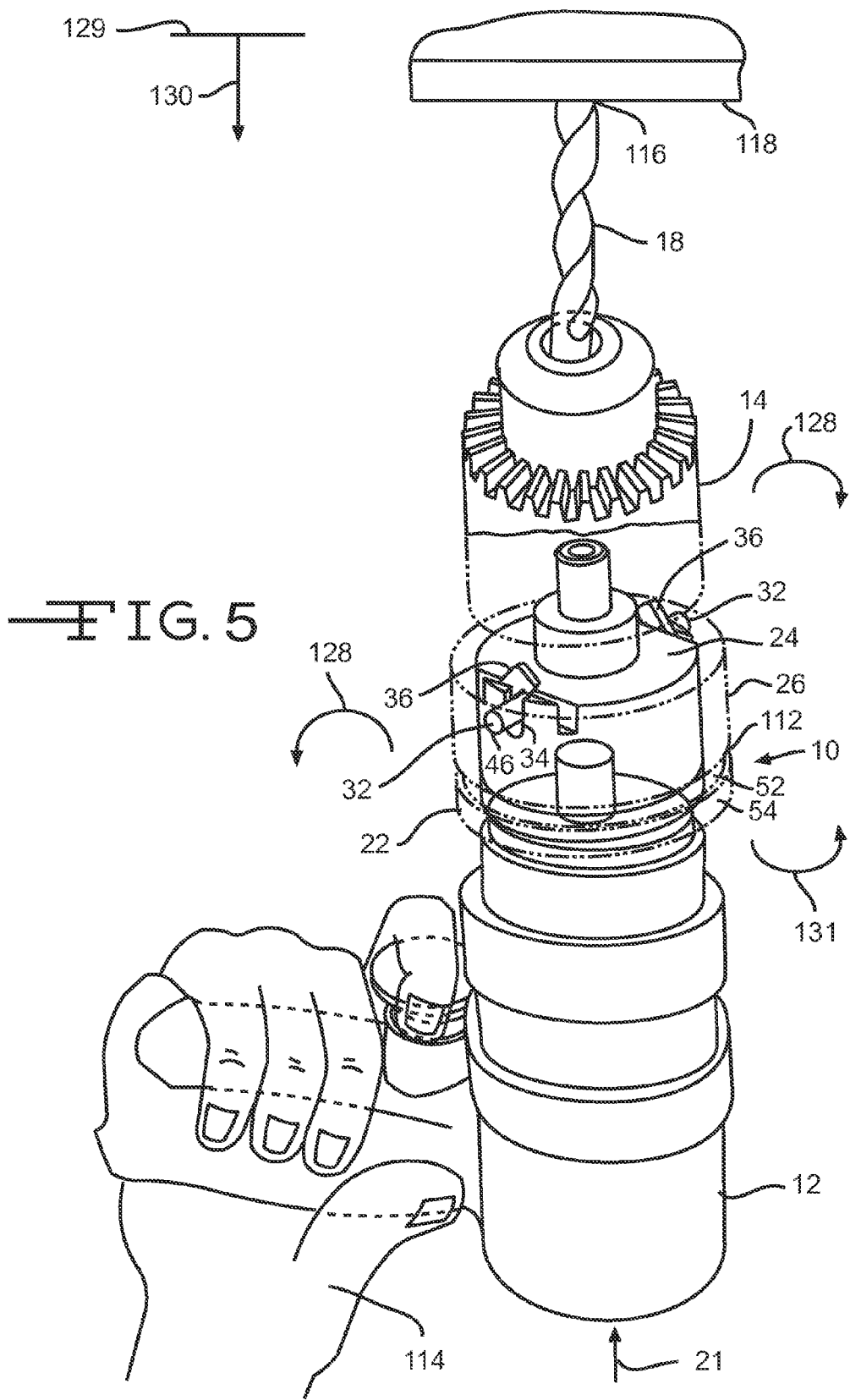
FIG. 5 illustrates the perspective view of the hand-held drill of FIG. 4 with the user increasing the amount of thrust being placed on the hand-held drill to drill the hole in the surface.

FIG. 5 illustrates the perspective view of the hand-held drill 10 of FIG. 4 with the user 114 increasing the amount of thrust 21 being placed on the hand-held drill 10 to drill the hole 116 in the surface 118. The amount of thrust 21 being placed on the hand-held drill 10 is getting close to overcoming the thrust threshold 129 comprising the opposed forces 130 of the biasing member 28 and the driven mating members 36 which are hidden from view but viewable in FIG. 3. As a result, the thrust 21 being placed on the hand-drill 10 is forcing the driver mating members 32, disposed within the holes 46 of the driver member 22 and the driven mating members 34, against the driven mating members 36. This thrust 21 is rotating the driven mating members 36 in respective opposite directions 128 which, due to their rotation, are beginning to uncover the driven mating members 34 and the driver mating members 32. The drill motor 12 is still rotating the driver member 22 in direction 131 which in turn rotates the driven member 24 in direction 131 which in turn rotates the drill chuck 14 in direction 131 which in turn rotates the drill bit 18 in direction 131. The driver member 22 still rotates the driven member 24 because the driven mating members 36 are still disposed over both the driven mating members 34 and the driver mating members 32. The segment 112 of the indicator 26 is still positioned along the acceptable portion 52 outside of the unacceptable portion 54 indicating to the user 114 that the thrust 21 being asserted on the hand-held drill 10 is within an acceptable range. However, the segment 112 of the indicator 26 is gradually moving towards the unacceptable portion 54 and beginning to cover up the acceptable portion 52 with the segment 112 of the indicator 26.

Figure 6:
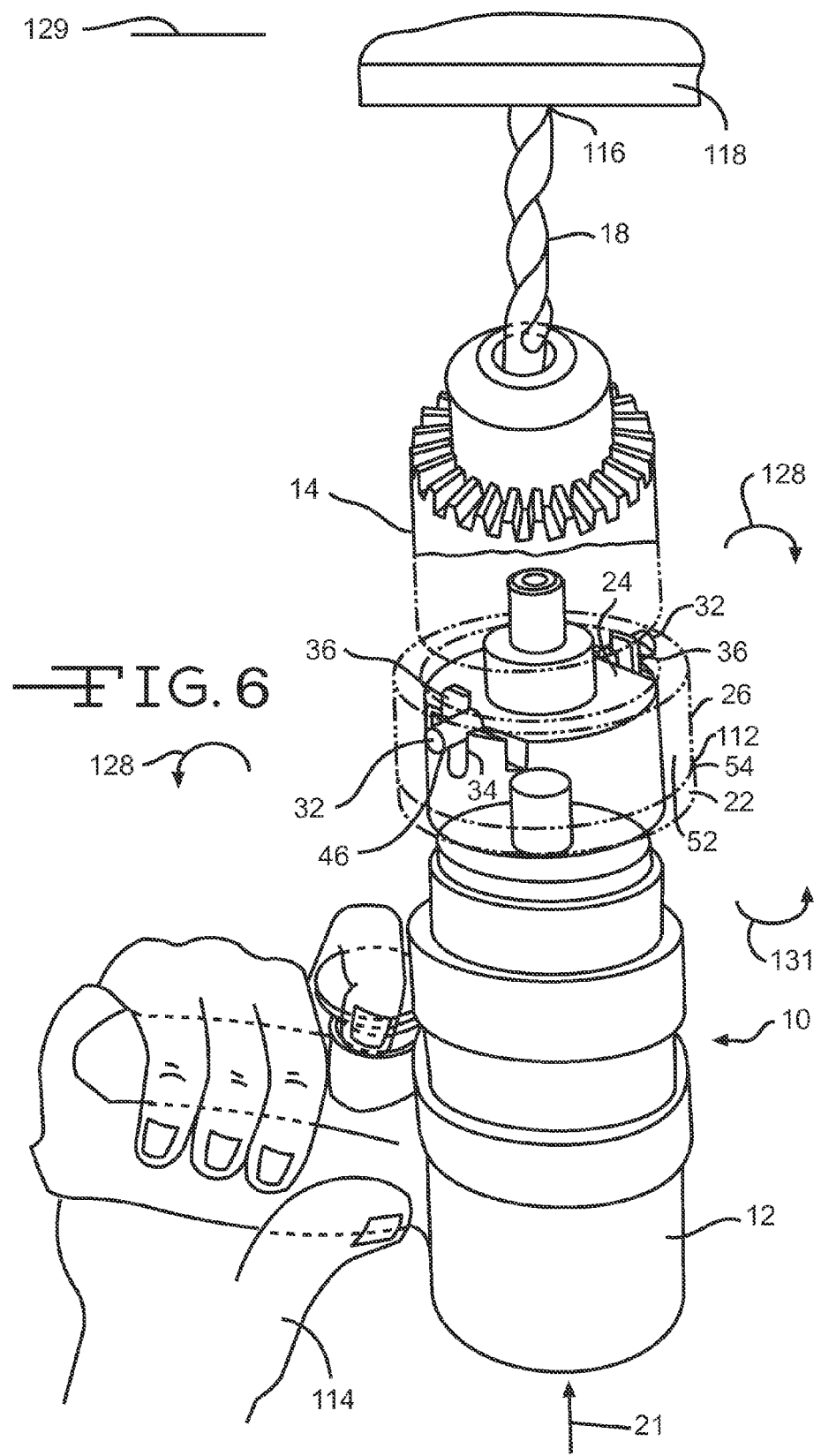
FIG. 6 illustrates the perspective view of the hand-held drill of FIG. 5 with the user further increasing the amount of thrust on the hand-held drill over a thrust threshold causing the thrust-indicator assembly to un-mate the drill chuck from the drill motor.

FIG. 6 illustrates the perspective view of the hand-held drill 10 of FIG. 5 with the user 114 increasing the amount of thrust 21, over the thrust threshold 129, being placed on the hand-held drill 10 to drill the hole 116 in the surface 118. The thrust 21 being placed on the hand-drill 10 has forced the driver mating members 32, disposed within the holes 46 of the driver member 22 and the driven mating members 34, against the driven mating members 36 rotating the driven mating members 36 in respective opposite directions 128 to uncover the driven mating members 34 and the driver mating members 32. Although the drill motor 12 is still rotating the driver member 22 in direction 131, the driven member 24 is no longer driven by the driver member 22 in direction 131 due to the driver mating members 32 no longer being disposed within the driven mating members 34. As a result, the driven member 24 is now unmated from the driver member 22 which in turn stops rotation of the drill chuck 14 and the drill bit 18 in direction 131. The segment 112 of the indicator 26 is now positioned along the unacceptable portion 54 outside of and completing covering up the acceptable portion 52 indicating to the user 114 that the thrust 21 being asserted on the handheld drill 10 is outside of the acceptable range.

Figure 7:
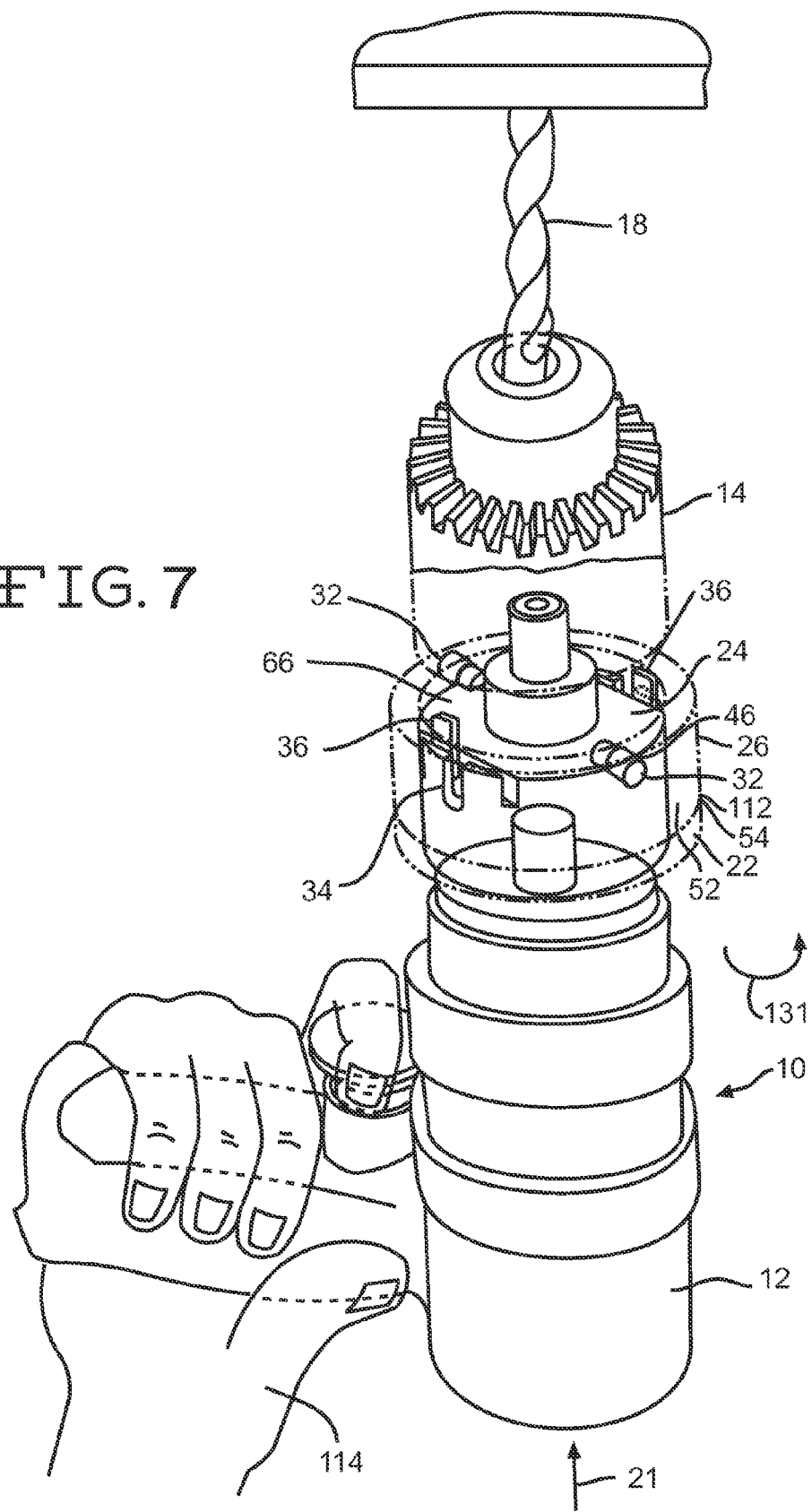
FIG. 7 illustrates the perspective view of the hand-held drill of FIG. 6 with a driver member having rotated relative to a driven member of the thrust-indicator assembly due to their un-mating of the drill chuck and the drill motor.

FIG. 7 illustrates the perspective view of the hand-held drill 10 of FIG. 6 with the drill motor 12 having rotated the driver member 22 and the driver mating members 32 disposed within the holes 46 of the driver member 22 ninety degrees in direction 131 relative to the driven member 24 and the driven mating members 34 and 36 due to the driver mating members 32 no longer being mated to the driven mating members 34 and 36. The driven mating members 36 are still disposed in positions completely uncovering the driven mating members 34. Although the driver mating members 32 are no longer held in place by the driven mating members 34 and 36, the driver mating members 32 attached within the holes 46 of the driver member 22 are disposed over the outer surface 66 of the driven member 24 preventing the driven member 24 from separating from the cylindrical opening 44 (see FIG. 3) of the driver member 22. The driven member 24, drill chuck 14, and drill bit 18 continue to no longer be rotated by the drill motor 12 and driver member 22. The segment 112 of the indicator 26 remains positioned along the unacceptable portion 54 outside of and completing covering up the acceptable portion 52 indicating to the user 114 that the thrust 21 being asserted on the hand-held drill 10 is outside of the acceptable range.

Figure 8:
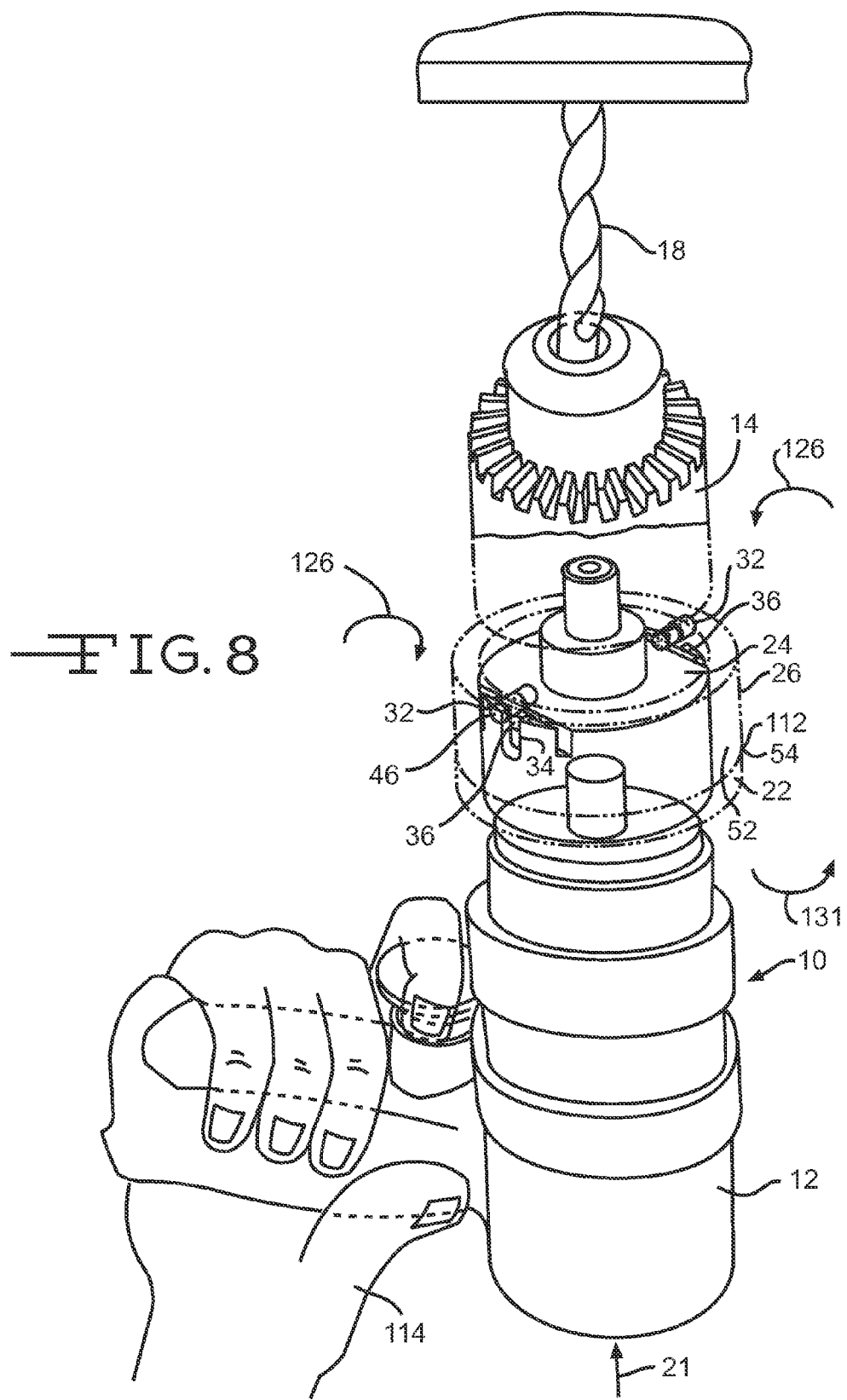
FIG. 8 illustrates the perspective view of the hand-held drill of FIG. 7 with the driver member having rotated further relative to the driven member of the thrust-indicator assembly due to their un-mating of the drill chuck and the drill motor.

FIG. 8 illustrates the perspective view of the hand-held drill 10 of FIG. 7 with the drill motor 12 having rotated the driver member 22 and the driver mating members 32 disposed within the holes 46 of the driver member 22 an additional ninety degrees in direction 131 (for a total of one-hundred-eighty degrees in direction/rotation 131 relative to FIG. 6) relative to the driven member 24 and the driven mating members 34 and 36 due to the driver mating members 32 no longer being mated to the driven mating members 34 and 36. This rotation 131 of the driver mating members 32 has forced the driver mating members 32 against the driven mating members 36 forcing the driven mating members 36 to rotate in respective opposite directions 126 to cover the driven mating members 34. Although the driver mating members 32 are no longer held in place by the driven mating members 34 and 36, the driver mating members 32 attached within the holes 46 of the driver member 22 are disposed over and against the driven mating members 36 and the driven mating members 34 of the driven member 24 preventing the driven member 24 from separating from the cylindrical opening 44 (see FIG. 3) of the driver member 22. The driven member 24, drill chuck 14, and drill bit 18 continue to no longer be rotated by the drill motor 12 and driver member 22. The segment 112 of the indicator 26 remains positioned along the unacceptable portion 54 outside of and completing covering up the acceptable portion 52 indicating to the user 114 that the thrust 21 being asserted on the hand-held drill 10 is outside of the acceptable range.

Figure 9:
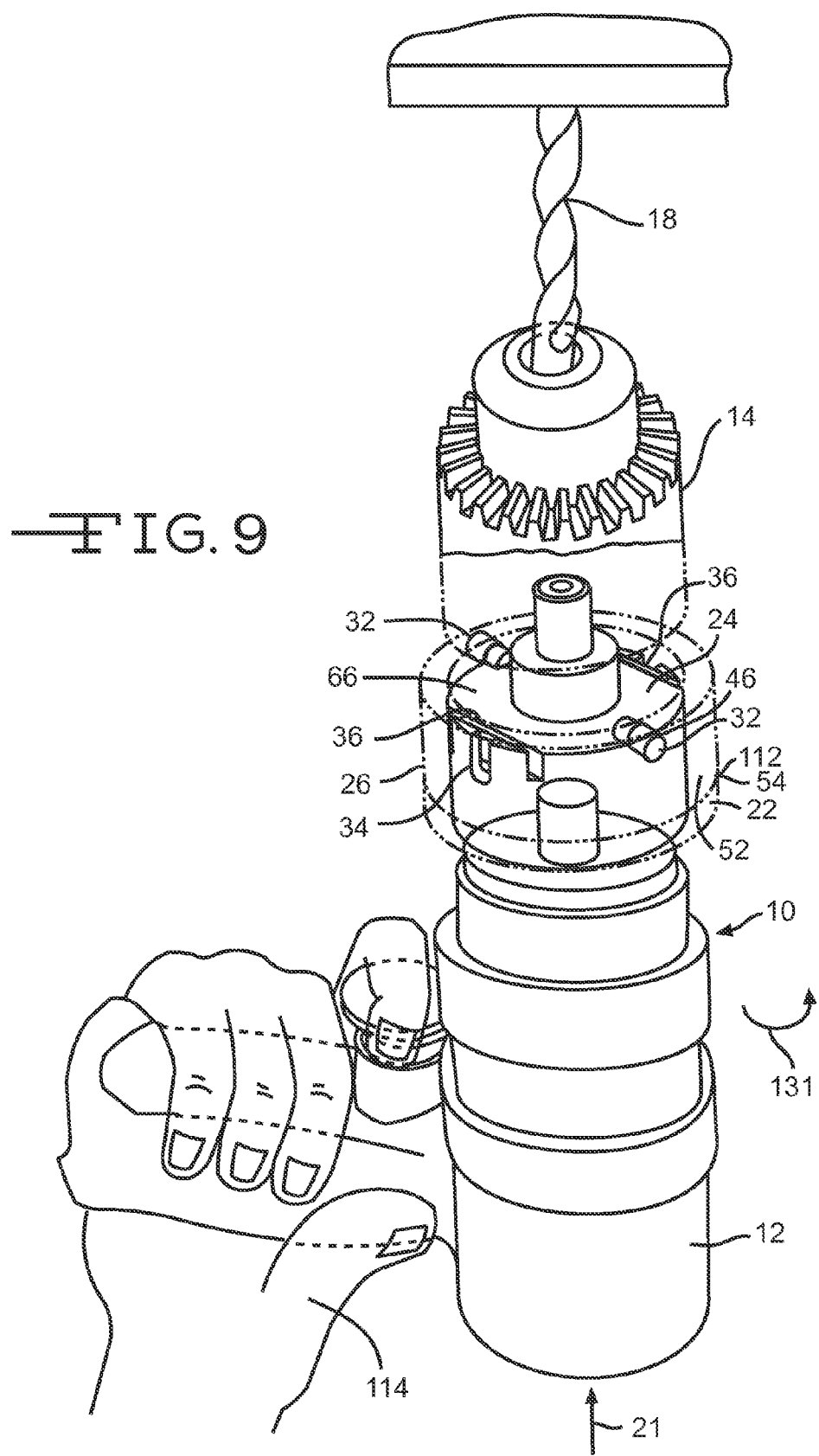
FIG. 9 illustrates the perspective view of the hand-held drill of FIG. 8 with the driver member having rotated still further relative to the driven member of the thrust-indicator assembly due to their un-mating of the drill chuck and the drill motor.

FIG. 9 illustrates the perspective view of the hand-held drill 10 of FIG. 8 with the drill motor 12 having rotated the driver member 22 and the driver mating members 32 disposed within the holes 46 of the driver member 22 an additional ninety degrees in direction 131 (for a total of two-hundred-seventy degrees in direction 131 relative to FIG. 6) relative to the driven member 24 and the driven mating members 34 and 36 due to the driver mating members 32 no longer being mated to the driven mating members 34 and 36. Although the driver mating members 32 are no longer held in place by the driven mating members 34 and 36, the driver mating members 32 attached within the holes 46 of the driver member 22 are disposed over the outer surface 66 of the driven member 24 preventing the driven member 24 from separating from the cylindrical opening 44 (see FIG. 3) of the driver member 22. The driven member 24, drill chuck 14, and drill bit 18 continue to no longer be rotated by the drill motor 12 and driver member 22. The segment 112 of the indicator 26 remains positioned along the unacceptable portion 54 outside of and completely covering up the acceptable portion 52 indicating to the user 114 that the thrust 21 being asserted on the hand-held drill 10 is outside of the acceptable range.

Figure 10:
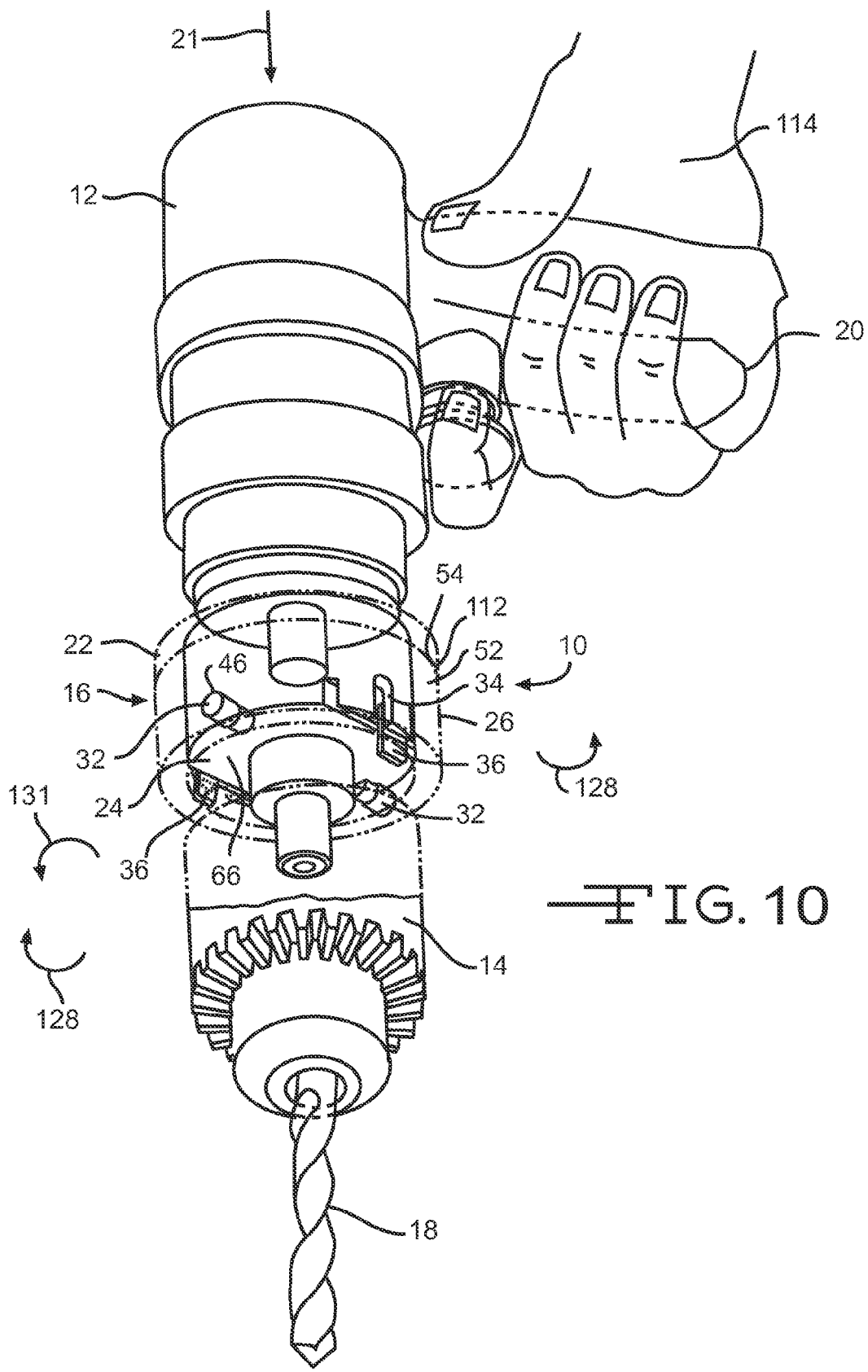
FIG. 10 illustrates the perspective view of the hand-held drill of FIG. 9 with the user having rotated the hand-held drill upside down to begin the process of re-setting the thrust-indicator assembly to re-mate the drill chuck to the drill motor.

FIG. 10 illustrates the perspective view of the hand-held drill 10 of FIG. 9 with the user 114 having rotated the hand-held drill 10 upside down, with the handle 20 disposed on top, in order to reset the thrust-indicator assembly 16 to begin the process of re-mating the driver mating members 32 of the driver member 22 with the driven mating members 34 and 36 of the driven member 24. During this resetting process, the drill motor 12 is turned off until the thrust-indicator assembly 16 has been reset and the hand-drill 10 is ready to drill during which time thrust 21 is not asserted on the hand-held drill 10. The driver mating members 32 disposed within the holes 46 of the driver member 22 are still in their same rotated positions (rotated a total of two-hundred-seventy degrees of rotation 131 relative to FIG. 6) of FIG. 9 relative to the driven mating members 34 and 36 of the driven member 24. Although the driver mating members 32 are no longer held in place by the driven mating members 34 and 36, the driver mating members 32 attached within the holes 46 of the driver member 22 are disposed against the outer surface 66 of the driven member 24 preventing the driven member 24 from separating from the cylindrical opening 44 (see FIG. 3) of the driver member 22. The driven mating members 36 have rotated in respective opposite directions 128 from their positions of FIG. 9 to uncover the driven mating members 34 due to the force of gravity. The driven member 24, drill chuck 14, and drill bit 18 continue to no longer be rotated by the drill motor 12 and driver member 22. The segment 112 of the indicator 26 remains positioned along the unacceptable portion 54 outside of and completely covering up the acceptable portion 52.

Figure 11:
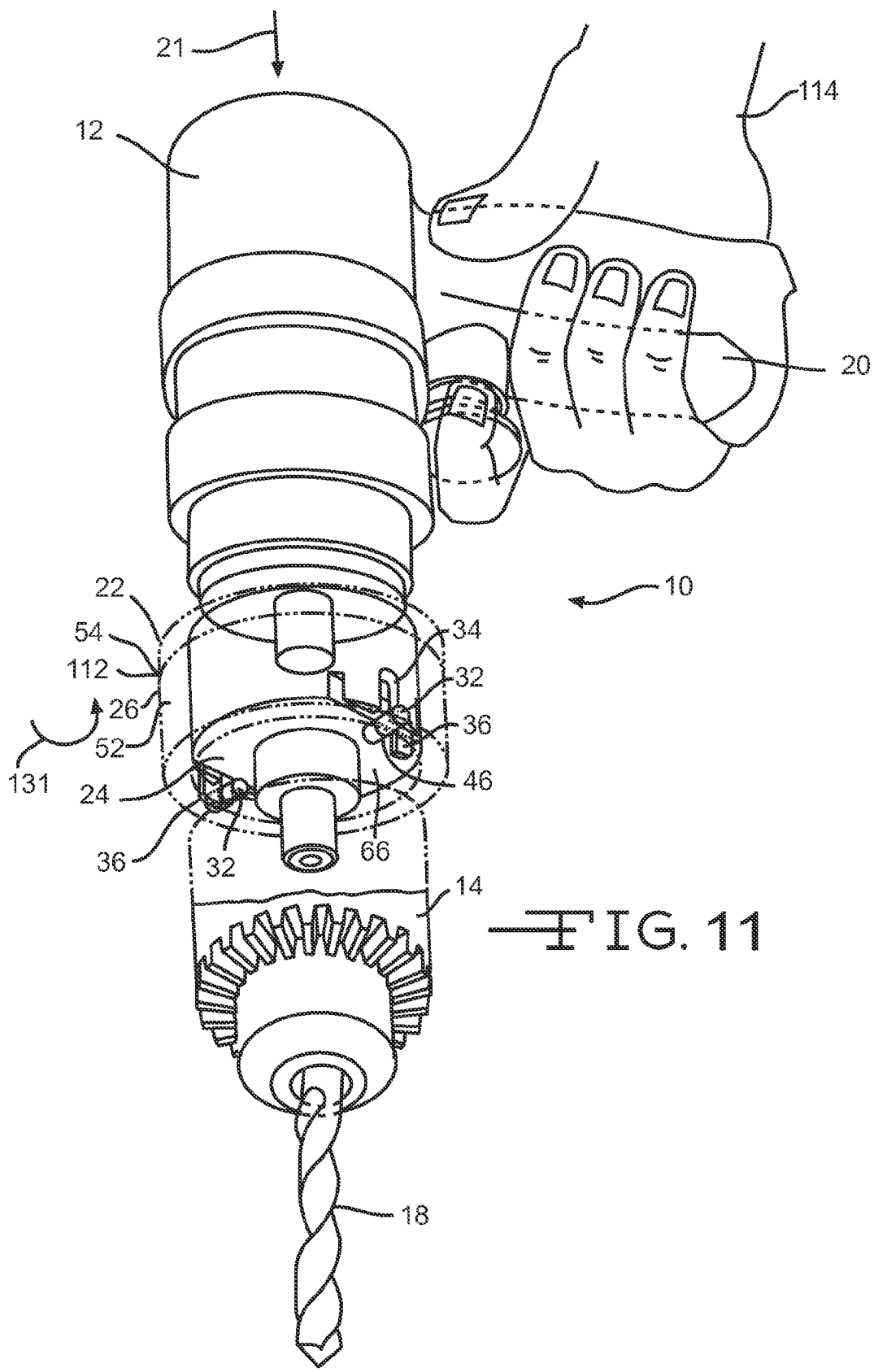
FIG. 11 illustrates the perspective view of the hand-held drill of FIG. 10 with the hand-held drill positioned upside down and the user having rotating the drill chuck and the driven member relative to the driver member and the drill motor in order to realign and reset them.

FIG. 11 illustrates the perspective view of the hand-held drill 10 of FIG. 10 with the hand-held drill 10 still being positioned upside down with the handle 20 disposed on top. The drill motor 12 remains turned off and thrust 21 is not being asserted on the hand-held drill 10. The user 114, by placing one hand on the handle 20 and another hand on the drill chuck 14, has rotated the drill chuck 14, and along with it the driven member 24 and the attached driven mating members 34 and 36, ninety degrees of rotation 131 relative to the driver member 22, the driver mating members 32, and the drill motor 12. The driven mating members 36 are still in their downward position of FIG. 10 uncovering the driven mating members 34 due to the force of gravity. The driver mating members 32 attached within the holes 46 of the driver member 22 are disposed against the driven mating members 36 aligned immediately below the driven mating members 34. Although the driver mating members 32 are not held in place by the driven mating members 34 and 36, the driver mating members 32 attached within the holes 46 of the driver member 22 are disposed against the outer surface 66 of the driven member 24 preventing the driven member 24 from separating from the cylindrical opening 44 (see FIG. 3) of the driver member 22. The driven member 24, drill chuck 14, and drill bit 18 continue to no longer be rotated by the drill motor 12 and driver member 22. The segment 112 of the indicator 26 remains positioned along the unacceptable portion 54 outside of and completely covering up the acceptable portion 52.

Figure 12:
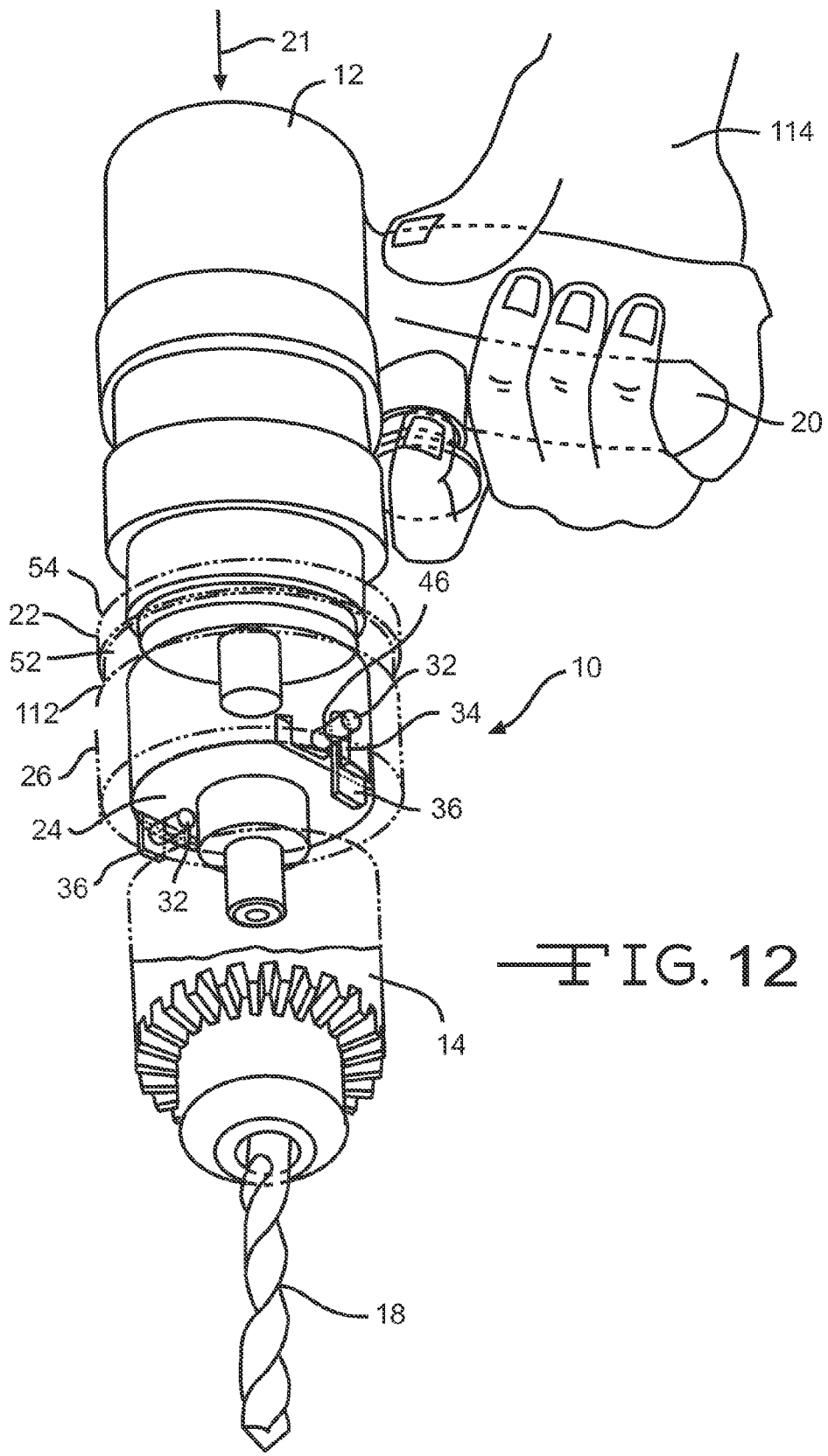
FIG. 12 illustrates the perspective view of the hand-held drill of FIG. 11 with the hand-held drill positioned upside down and the driven member and the driver member of the thrust-indicator assembly having re-mated to re-mate and reset the drill chuck to the drill motor.

FIG. 12 illustrates the perspective view of the hand-held drill 10 of FIG. 11 with the hand-held drill 10 still being positioned upside down with the handle 20 disposed on top. The drill motor 12 remains turned off and thrust 21 is not being asserted on the hand-held drill 10. The driven mating members 36 are still in their position of FIG. 11 uncovering the driven mating members 34 due to the force of gravity. Due to the user 114 no longer asserting thrust 21 on the drill motor 12, the biasing member 28 (see FIG. 3) has forced the driver member 22 and the driven member 24 away from one another thereby forcing the driver mating members 32 disposed within the holes 46 of the driver member 22 to move within the driven mating members 34 of the driven member 24. The driven mating members 34 hold the driver mating members 32 in place preventing the driven member 24 from separating from the cylindrical opening 44 (see FIG. 3) of the driver member 22. The driven member 24, drill chuck 14, and drill bit 18 are now ready to be rotated by the drill motor 12 and driver member 22 when the drill motor 12 is turned on. The segment 112 of the indicator 26 is now re-positioned along the acceptable portion 52, outside of the unacceptable portion 54, allowing the acceptable portion 52 to be viewed by the user 114 since it is no longer covered by the segment 112 of the indicator 26.

Figure 13:
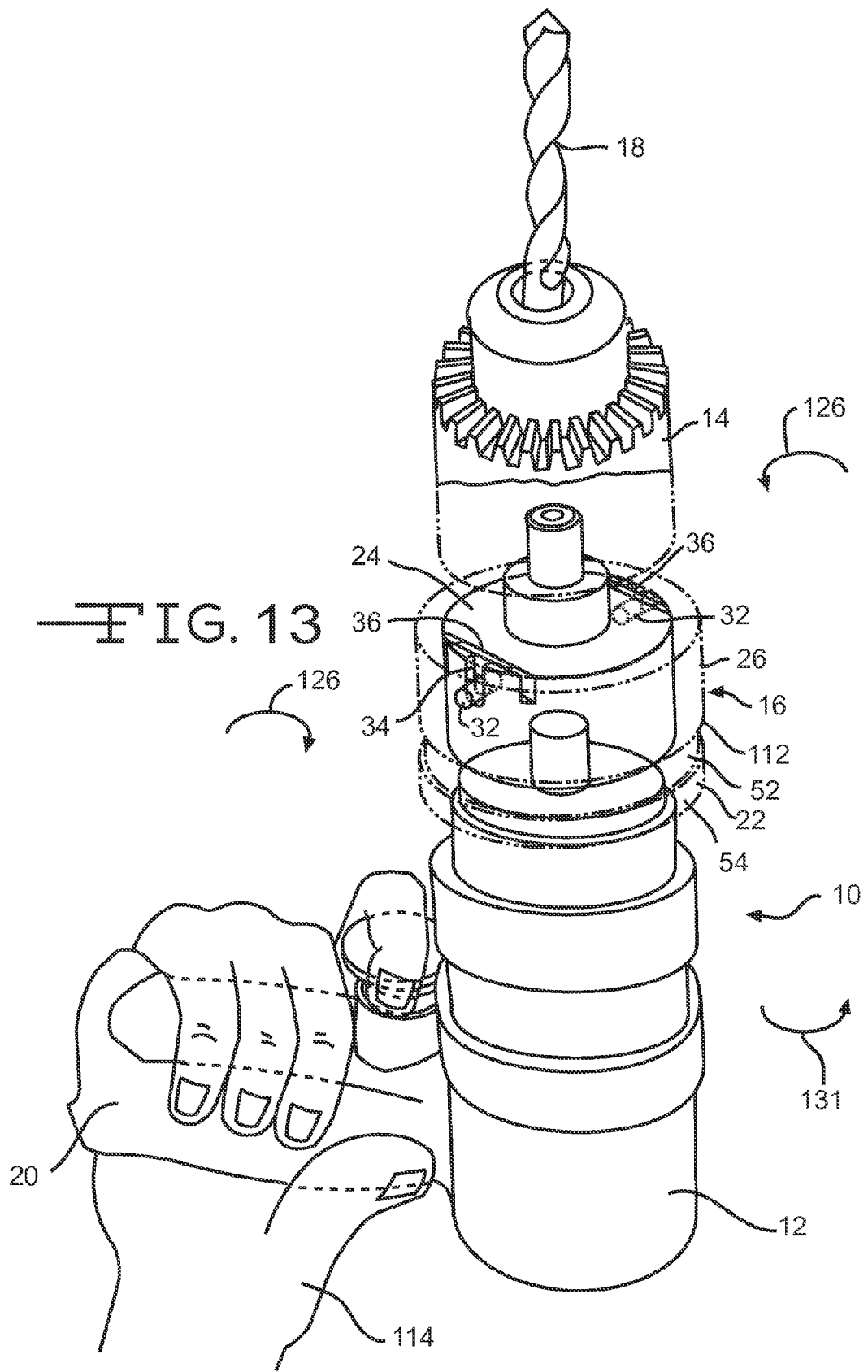
FIG. 13 illustrates the perspective view of the hand-held drill of FIG. 12 with the hand-held drill having been rotated by the user right-side up with the thrust-indicator assembly re-set, re-mating the drill chuck to the drill motor, and the hand-drill ready to be used.

FIG. 13 illustrates the perspective view of the hand-held drill 10 of FIG. 12 with the hand-held drill 10 having been rotated by the user 114 right-side up with the handle 20 disposed on bottom. Due to the force of gravity, the driven mating members 36 have now rotated in respective opposite directions 126 to completely cover the driven mating members 34 and the driver mating members 32 disposed within the driven mating members 34. The thrust-indicator assembly 16 is now reset and the hand-held drill 10 is ready to be turned on and used. When the drill motor 12 is turned on, the drill motor 12 will rotate the driver member 22 in direction 131 which in turn will rotate the driven member 24 in direction 131 which in turn will rotate the drill chuck 14 in direction 131 which in turn will rotate the drill bit 18 in direction 131. The driver member 22 will rotate the driven member 24, when the drill motor 12 is turned on, because the driver mating members 32 are disposed within the driven mating members 34 with the driven mating members 36 disposed over both the driven mating members 34 and the driver mating members 32. The segment 112 of the indicator 26 is positioned along the acceptable portion 52, outside of the unacceptable portion 54, allowing the acceptable portion 52 to be viewed by the user 114 since it is no longer covered by the segment 112 of the indicator 26. This indicates to the user 114 that the hand-held drill 10 is ready to be used. As shown in FIG. 4, the drilling process may now be repeated to drill a hole 116 in a surface 118 using the hand-held drill 10.

Figure 14:
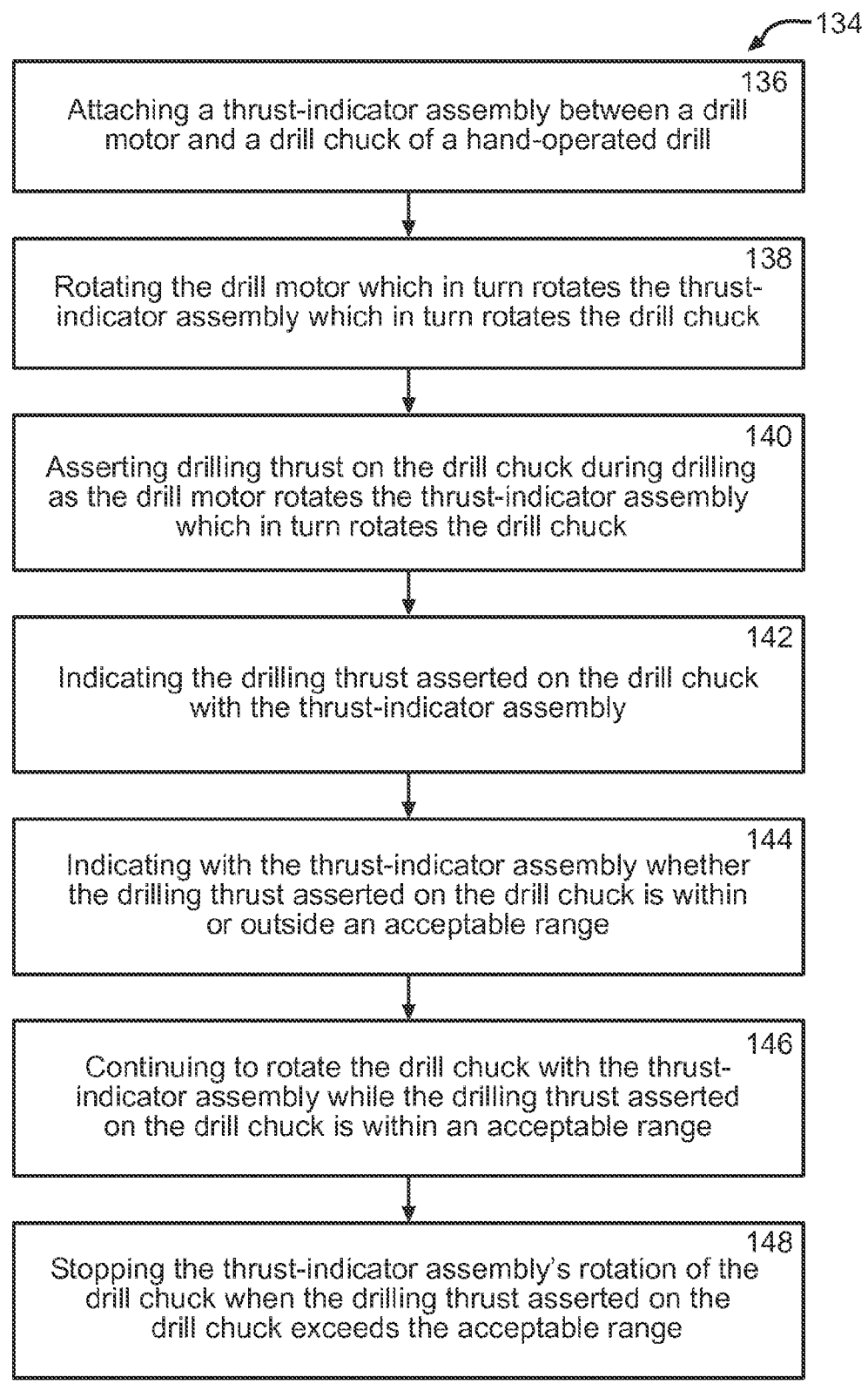
FIG. 14 illustrates a flowchart showing one embodiment of a method of indicating a drilling thrust asserted on a hand-held operated drill.

FIG. 14 illustrates a flowchart 134 showing one embodiment of a method of indicating a drilling thrust asserted on a hand-held operated drill. In step 136, a thrust-indicator assembly is attached between a drill motor and a drill chuck of a hand-operated drill. In step 138, the drill motor is rotated, which in turn rotates the thrust-indicator assembly, which in turn rotates the drill chuck. In step 140, drilling thrust is asserted on the drill chuck during drilling as the drill motor rotates the thrust-indicator assembly which in turn rotates the drill chuck. In step 142, the drilling thrust asserted on the drill chuck is indicated with the thrust-indicatory assembly. In step 144, the thrust-indicator assembly indicates whether the drilling thrust asserted on the drill chuck is within or outside of an acceptable range. In step 146, the thrust-indicator assembly continues to rotate the drill chuck while the drilling thrust asserted on the drill chuck is within an acceptable range. In step 148, the thrust-indicator assembly stops its rotation of the drill chuck when the drilling thrust asserted on the drill chuck exceeds the acceptable range. In other embodiments, one or more steps of the method may be modified or not followed, or one or more additional steps may be added.

One or more embodiments of the disclosure reduces one or more issues of the prior art by indicating to a user the amount of thrust being asserted on a hand-operated drill during a drilling process. One or more embodiments of the disclosure indicates to a user whether the amount of thrust being asserted on a hand-operated drill is within or outside of an acceptable range. One or more embodiments of the disclosure stops a hand-operated drill from drilling further when the amount of thrust being asserted on the hand-operated drill exceeds a thrust threshold. One or more embodiments of the disclosure assists a user in one or more of the following: placing an optimum range of thrust on a hand-operated drill in order to efficiently drill a hole in a surface; drilling in a safe manner; drilling with reduced ergonomic issues; drilling with reduced work-hardening of the surface; drilling with a reduced amount of effort; drilling with a reduced amount of damage being done to the drill bit, to the drill, or to the surface; or drilling a high quality hole. One or more embodiments of the disclosure is simple to implement in existing hand-operated drills without having to modify the existing hand-operated drills, and without adding a significant amount of weight or size to the drills.

It should be understood, of course, that the foregoing relates to exemplary embodiments of the disclosure and that modifications may be made without departing from the spirit and scope of the disclosure as set forth in the following claims.

We claim:

1. An apparatus which indicates a drilling thrust of a hand-operated drill comprising:
    a thrust-indicator assembly configured to attach between a drill motor and a drill chuck of a hand-operated drill to indicate a drilling thrust, the thrust-indicator assembly comprising: a driven member, a driver member, a driven mating member, and a driver mating member;
    wherein when the drill motor is rotating and a drilling thrust is under a thrust threshold the driver mating member is configured to extend through a hole in the driver member and through a slot in the driven member and the driven mating member is configured to remain mated with the driver mating member so that the driven member rotates with the driver member so that the driven member rotates the drill chuck;
    wherein when the drill motor is rotating and the drilling thrust is over the thrust threshold the driven mating member is configured to un-mate from the driver mating member so that the driven member stops rotating thereby stopping rotation of the drill chuck while the driver member continues to rotate with the drill motor.

2. The apparatus of claim 1 wherein the thrust-indicator assembly comprises attachment members disposed on opposed ends.

3. The apparatus of claim 1 wherein the thrust-indicator assembly comprises an indicator which indicates whether the drilling thrust is within an acceptable range.

4. The apparatus of claim 3 wherein the driver member is moveably attached to the indicator, the indicator configured to indicate that the drilling thrust is within an acceptable range when a segment of the indicator is disposed along an acceptable portion of the driver member and configured to indicate that the drilling thrust is outside the acceptable range when the segment of the indicator is disposed outside of the acceptable portion of the driver member.

5. The apparatus of claim 1 wherein the thrust-indicator assembly comprises an expansion spring which expands along a longitudinal direction and biases the driver member and the driven member away from one another.

6. The apparatus of claim 5 wherein the expansion spring is disposed around inner shafts of the driver and driven members biasing the driver member and the driven member away from one another.

7. The apparatus of claim 1 wherein the driver mating member comprises a lug.

8. The apparatus of claim 1 wherein the driven mating member is rotate-ably attached to the driven member.

9. The apparatus of claim 8 wherein the driven mating member comprises a pawl.

10. The apparatus of claim 1 wherein the driver mating member comprises a lug and the driven mating member comprises a pawl rotate-ably attached to the driven member.

11. A hand-operated drill comprising:
a drill motor;
a drill chuck; and
a thrust-indicator assembly attached between the drill motor and the drill chuck to indicate a drilling thrust, the thrust-indicator assembly comprising: a driven member, a driver member, a driven mating member, and a driver mating member;
wherein when the drill motor is rotating and a drilling thrust is under a thrust threshold the driver mating member is configured to extend through a hole in the driver member and through a slot in the driven member and the driven mating member is configured to remain mated with the driver mating member so that the driven member rotates with the driver member so that the driven member rotates the drill chuck;
wherein when the drill motor is rotating and the drilling thrust is over the thrust threshold the driven mating member is configured to un-mate from the driver mating member so that the driven member stops rotating thereby stopping rotation of the drill chuck while the driver member continues to rotate with the drill motor.

12. The hand-operated drill of claim 11 wherein the thrust-indicator assembly comprises an indicator which indicates whether the drilling thrust is within an acceptable range.

13. The apparatus of claim 12 wherein the driver member is moveably attached to the indicator, wherein the indicator is configured to indicate that the drilling thrust is within the acceptable range when a segment of the indicator is disposed along an acceptable portion of the driver member and is configured to indicate that the drilling thrust is outside the acceptable range when the segment of the indicator is disposed outside of the acceptable portion of the driver member.

14. The apparatus of claim 11 wherein the driver member is fixedly attached to the drill motor and the driven member is fixedly attached to the drill chuck.

15. The apparatus of claim 11 wherein the thrust-indicator assembly comprises an expansion spring biasing the driver member and the driven member away from one another.

16. The hand-operated drill of claim 11 wherein the driver mating member comprises a lug.

17. The hand-operated drill of claim 11 wherein the driven mating member is rotate-ably attached to the driven member.

18. The hand-operated drill of claim 11 wherein the driven mating member comprises a pawl.

19. The hand-operated drill of claim 11 wherein the driver mating member comprises a lug and the driven mating member comprises a pawl rotate-ably attached to the driven member.

20. A method of indicating a drilling thrust asserted on a hand-operated drill comprising:
attaching a thrust-indicator assembly, comprising a driven member, a driver member, a driven mating member, and a driver mating member, between a drill motor and a drill chuck of a hand-operated drill; and
indicating with the thrust-indicator assembly a drilling thrust asserted on the drill chuck so that when the drill motor is rotating and the drilling thrust asserted on the drill chuck is below a thrust threshold the thrust-indicator assembly rotates the drill chuck due to the driver mating member extending through a hole in the driver member and through a slot in the driven member thereby mating the driven member to the driver member so that the driven member rotates with the driver member thereby rotating the drill chuck, but when the drilling thrust asserted on the drill chuck exceeds the thrust threshold the thrust-indicator assembly stops rotating the drill chuck due to the driven mating member un-mating from the driver mating member thereby un-mating the driven member from the driver member so that the driven member stops rotating thereby stopping rotation of the drill chuck while the drill motor continues to rotate.

21. The method of claim 20 wherein the indicating step indicates whether the drilling thrust asserted on the drill chuck is within an acceptable range, and also indicates whether the drilling thrust asserted on the drill chuck is outside of the acceptable range.

22. The method of claim 20 wherein the driver mating member comprises a lug.

23. The method of claim 20 wherein the driven mating member is rotate-ably attached to the driven member.

24. The method of claim 20 wherein the driven mating member comprises a pawl.

25. The method of claim 20 wherein the driver mating member comprises a lug and the driven mating member comprises a pawl rotate-ably attached to the driven member.

* * * * *